March 17, 1942.   P. E. MERCIER   2,276,663
AIRSCREW SYSTEM
Filed Oct. 28, 1938   3 Sheets-Sheet 1
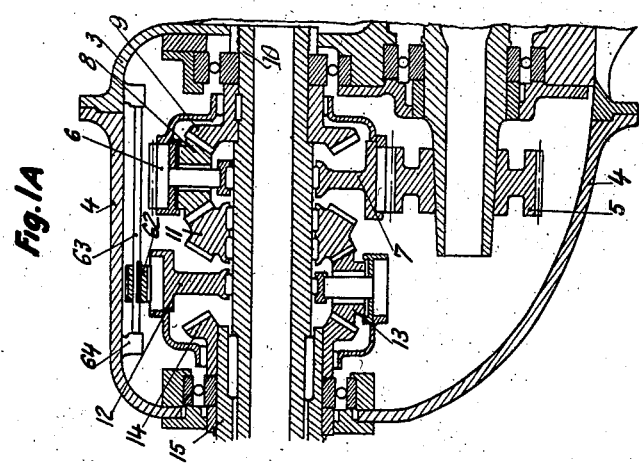
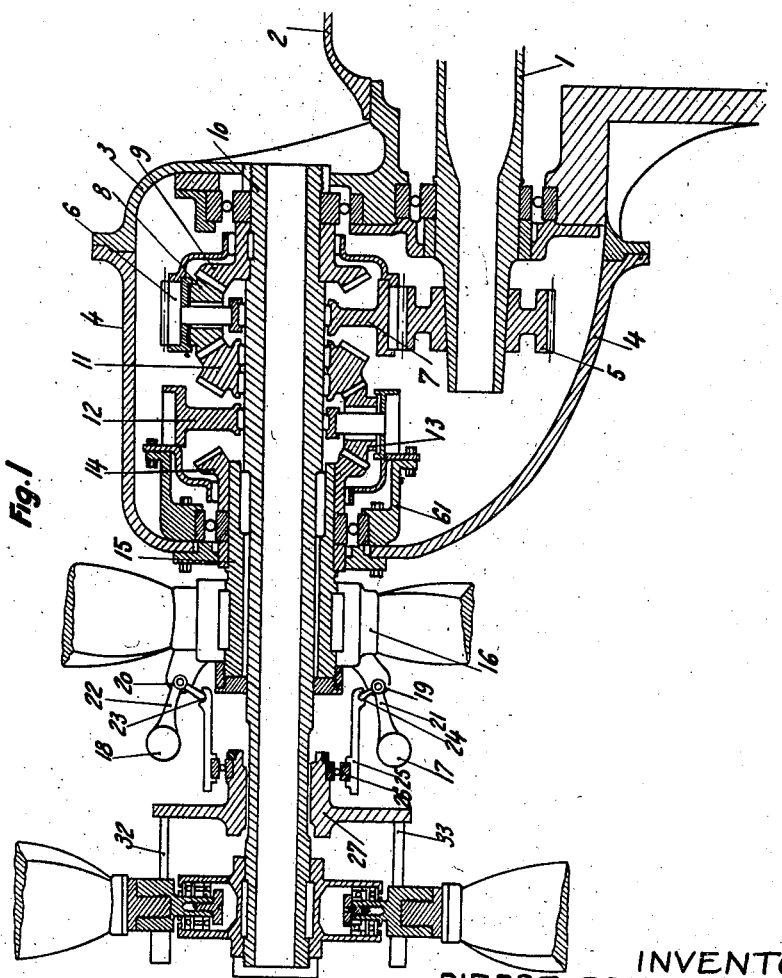
INVENTOR:
PIERRE ERNEST MERCIER
BY Haseltine Lake & Co.
ATTORNEYS INVENTOR:
PIERRE ERNEST MERCIER
BY: Haseltine, Lake & Co.
ATTORNEYS March 17, 1942.                P. E. MERCIER                 2,276,663
                             AIRSCREW SYSTEM
                            Filed Oct. 28, 1938          3 Sheets-Sheet 3
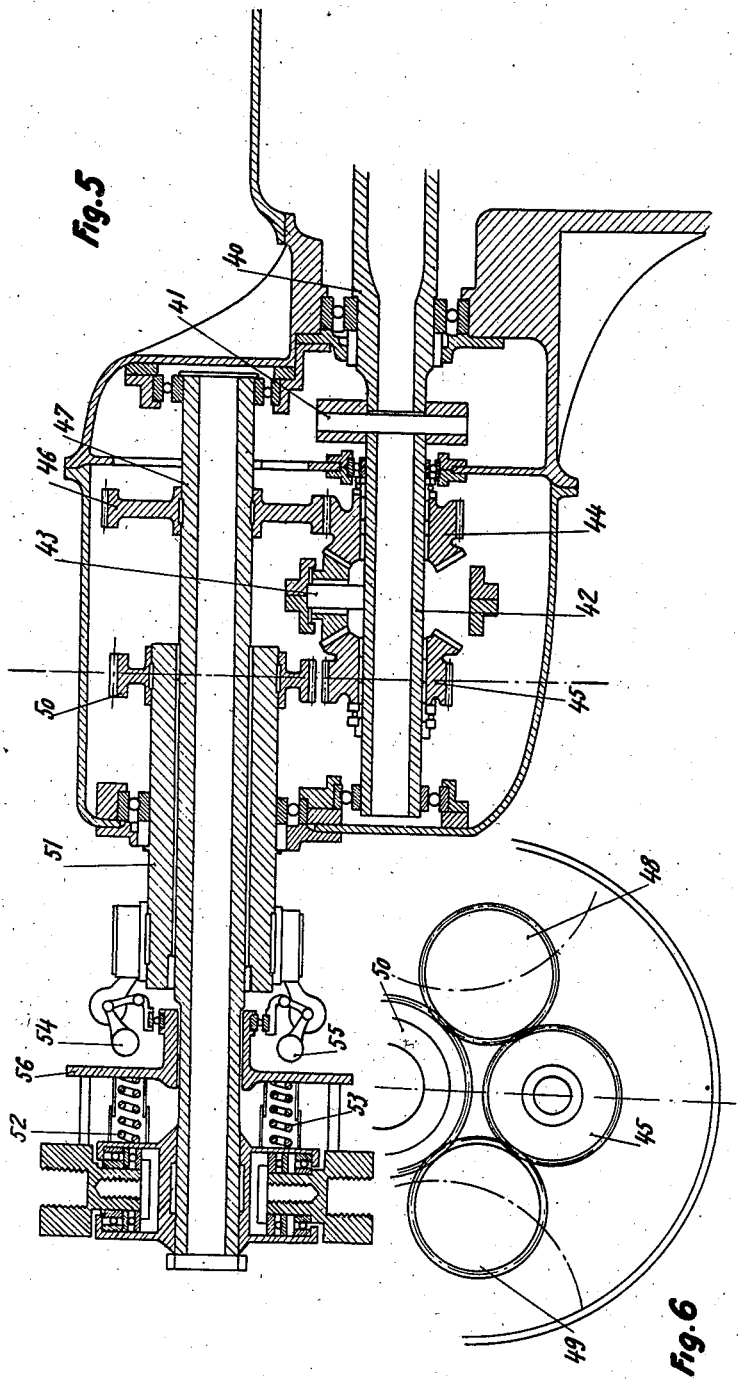
INVENTOR:
PIERRE ERNEST MERCIER
BY: *Haseltine, Lake & Co.*
ATTORNEYS Patented Mar. 17, 1942

2,276,663

UNITED STATES PATENT OFFICE 2,276,663

AIRSCREW SYSTEM

Pierre Ernest Mercier, Neuilly-sur-Seine, France

Application October 28, 1938, Serial No. 237,479
In France June 8, 1938

2 Claims. (Cl. 170—135.6)

This invention relates to airscrew systems comprising two coaxial airscrews arranged to be driven in opposite directions by a common engine.

It is not sufficient to drive two coaxial airscrews in opposite directions by a common motor in order to reduce the reaction couple of the whole unit to zero. If the speeds of rotation of the two airscrews bear a fixed ratio to one another, there generally exists a speed of translation of the system or a speed of the relative wind in which the system is situated at which the resultant couple is nullified at a given output. If variable-pitch airscrews are employed, there corresponds to each value of the pitch of one of the aircrews for a given speed of translation and a given output a well-defined value for the pitch of the other airscrew. It will be understood that it is difficult to provide a pitch-changing mechanism compatible with the use of two concentric shafts controlling one another in accordance with laws of correspondence, and which is dependent both on the output and on the relative wind. Moreover, it is advantageous according to the different conditions during descent or horizontal flight to be able to utilise the full power of a motor, and consequently to drive the driving shaft at a constant speed of rotation. The complications which would arise in the solution of such a problem affecting airscrew speeds of a given ratio will readily be understood. Cases exist in which it is particularly advantageous to provide an airscrew system having no reaction couple. This is necessary in particular in order to provide an entirely symmetrical single-engine system from the point of view of the controls and their reactions.

The main object of the invention is to solve the above-mentioned problems.

According to the invention the driving couple is equally divided by means of a differential, one of the driven wheels of which is connected either directly or with a given gear ratio to one of the airscrew shafts, while the other driven wheel of the said differential drives the second airscrew shaft either directly or with a given gear ratio through the intermediary of a reversing gear, the satellite gear train of the differential being driven by the driving member either directly or through a reduction gear.

According to a modification which is particularly advantageous in the case of engines having an irregular couple (such as engines having a small number of cylinders), the reaction couple of the reversing gear may be elastically balanced by means of torsion bars, springs or rubber members.

Further, the constancy of the driving conditions may be ensured by furnishing one of the airscrews with a variable-pitch, the control of which is dependent upon the speed of rotation of the second airscrew, which has a fixed pitch. In this way, the couple is kept constant by an automatic inverse variation of the respective speeds of each of the airscrews, the pitch control of the variable-pitch airscrew always acting in the inverse direction to the variation of the speed of the airscrew having a fixed pitch.

This method of control is greatly facilitated by the fact that each pitch value of the variable-pitch airscrew corresponds, with constant power, to ranges of operation of the fixed-pitch screw which vary greatly with the speed of the relative wind. A simple solution of the problem of the control in question resides, for example, in the use of weights influenced by centrifugal force and connected to the hub of the fixed-pitch air-screw, on which weights an opposing action is exerted by an elastic means of desired form, such as a spring or fluid under pressure, the elasticity curve of which has been suitably designed, the initial tension of the device being if necessary adjusted either on land or during flight so that constant driving conditions may be maintained at different powers.

The accompanying drawings illustrate by way of example the application of the invention to two embodiments using spur wheel gears. It is obvious that these are only specific constructions, and the same is also true with regard to the hereinafter described example of the control of the pitch of the front screw by the rear screw, the invention being capable of many other modifications.

Figure 1 illustrates in section a complete reduction gear with its differential and its reversing device, and the two hubs of the coaxial airscrews.

Figure 1A illustrates a modification of Figure 1.

Figures 5 and 6 illustrate a modification of Figure 1.

Figure 3:
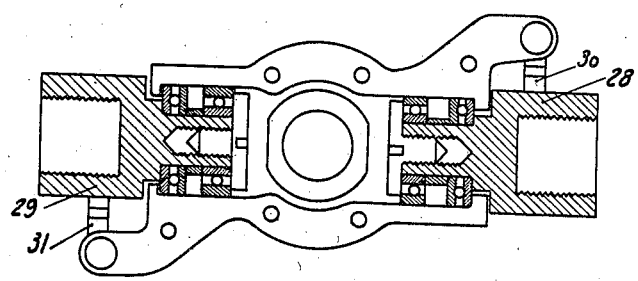
Figures 2, 3 and 4 illustrate more clearly the mechanism for controlling the pitch of the front airscrew.

In Figure 1, 1 designates the extremity of the driving shaft on the engine side of the reduction gear. The casing of the actual engine is shown at 2. The casing of the reduction gear is designated by 3 at its rear part and by 4 at its front part.

The driving shaft carries a spur wheel 5 which engages with the internally recessed spur gear 6 which is connected to the satellite carrier 7. One of the satellites of this carrier is shown at 8. One of the bevel wheels of the differential, of which the carrier 7 forms a part, is designated by 9 and is keyed on the shaft of the front airscrew 10. The other bevel wheel is coupled with the bevel wheel of the reversing gear arranged next to the differential; the double gear utilised is designated by 11. The satellite carrier of the reversing gear is designated by 12. One satellite of this carrier is shown at 13. The transmission wheel of the reversing gear is designated by 14 and is connected by means of the hollow shaft 15 to the hub of the rear airscrew 16. The satellite carrier 12 of the reversing gear is held stationary by a rigid connection to the casing by means of the piece 61. The hub of the rear airscrew carries the weights 17 and 18 articulated at 19 and 20 to the said hub by means of the bell crank levers 21 and 22 which, by means of the fingers 23 and 24, control the position of a sleeve 25. The sleeve 25 is connected in a lateral direction, through the intermediary of the deep-grooved ball bearing 26, to the member 27 controlling the pitch of the front airscrew and turning therewith.

Figure 1A represents a modification of Figure 1, in which the support 12, instead of being rigidly fixed to the case across the piece 61, is connected across an elastic connection. For this purpose the support 12 is provided on the outside with a gear which engages with one or several pinions 62 keyed to one or several torsion bars 63 the ends of which are housed in the pieces 64 fixed to the case.

If for any reason the velocity of the fixed pitch airscrew is supposed to increase, the velocity of the pinion 13 and that of the double pinion 11 also increase. The satellites 8, in lieu of rotating jointly with their axes around the shaft 10, will be driven on these with a movement of rotation, and the consequence of this supplemental movement will be a retardation of the pinion 9 and the shaft 10 on which it is keyed.

The increase of velocity of the airscrew 16 will have another effect: under the influence of centrifugal force the counterpoises 17 and 18 diverge more from each other, and by means of the levers 23, 24 and the ball bearing 26 impart to the member 27 controlling the pitch of the variable pitch airscrew a movement of translation which causes an increase of the pitch of said airscrew in such a manner that equal distribution of the couples on the two airscrews is entirely re-established.

Conversely, if for any reason the speed of the fixed pitch airscrew 16 is diminished, the speed of the pinions 13 and that of the double pinion 11 also diminish. The satellites 8 will then be driven with a movement of rotation about their respective axes in a direction opposite to that of the preceding case, and the consequence of this supplemental rotation is an acceleration of the pinion 9 and of the shaft 10 on which it is keyed.

The decrease of speed of the airscrew 16 also has the effect that, as the centrifugal force diminishes, the counterpoises 17 and 18 come nearer to each other and, by means of the levers 23, 24 and the ball bearing 26, impart to the member 27 a movement causing a decrease of the pitch of said airscrew, so that the quality of the couples on the airscrews is entirely re-established.

Figure 2:
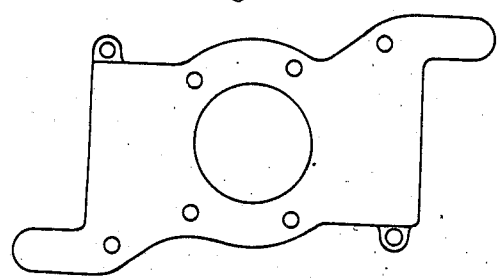

Figure 2 is a face view of the hub of the front airscrew.

Figure 3 is a section through the plane of symmetry of the member shown in Figure 2. Each of the blades of the front airscrew is secured in a socket, such as 28 and 29, mounted in the hub of the front airscrew. Each of the sockets 28 and 29 is furnished with a toothed sector 30 and 31.

Figure 4:
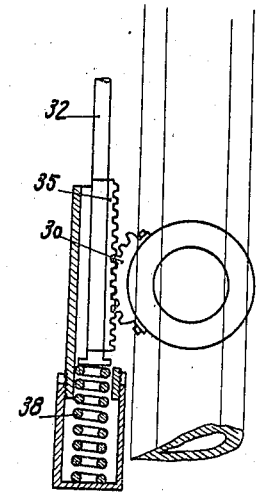

Figure 4 illustrates how the rods 32 and 33 secured to the member 27 are connected by means of racks, such as 35, with the toothed sectors 30 and 31. Springs such as 38 exert on the rods 32, 33 a thrust opposing the action of the centrifugal force on the weights 17 and 18.

Figures 5 and 6 illustrate a modification in which the driving shaft 40 engages through the intermediary of the resilient coupling 41 with the primary shaft 42 of the reduction gear, which is integral with the satellite spindles, such as 43, of the carrier of the differential. The double gear wheels 44 and 45 disposed on either side of the carrier are connected with spur wheels engaging with the shafts of the airscrews, directly in one case and through the intermediary of reversing toothed pinions 48 and 49 (Figure 6) in the other case. In one construction illustrated, the double gear 44 drives the front airscrew shaft 47 through the spur wheel 46, while the double gear 45 meshes with the reversing pinions 48 and 49 (Figure 6). These pinions mesh with the spur wheel 50 keyed on the rear airscrew shaft 51. The pitch-changing mechanism of the front airscrew is similar to that described with reference to Figure 1, the springs 52 and 53 which act in opposition to the weights 54 and 55, rotating with the rear airscrew, bearing directly on the plate 56 which is similar to the member 27 of Figure 1.

The specific constructions described may naturally be subjected to numerous structural modifications without exceeding the scope of the invention.

What I claim as my invention and desire to secure by Letters Patent of the United States is:

1. An airscrew system, comprising two airscrews mounted on coaxial shafts, a differential comprising two driven wheels and a satellite gear train, one of the said driven wheels having means for operatively connecting the same to transmit the driving movement to the shaft of one of the airscrews, the second driven wheel having means for operatively connecting the latter to transmit the driving movement to the shaft of the second airscrew, means for reversing the movement of the second shaft so that the airscrews rotate in opposite directions, elastic means interposed between the reversing means and a stationary part of the aircraft for the purpose of balancing the reaction couple of the reversing means, said elastic means comprising torsion bars fixed on the casing, rigid pinions fixedly mounted on said torsion bars, a cage and pinions mounted on said cage and provided with teeth meshing with said rigid pinions, and means for driving the said satellite gear train by means of the engine of the aircraft, said last mentioned means comprising a drive shaft with the axis thereof independent of that of the coaxial driven shafts, and gears connecting said drive shaft with said coaxial driven shafts.

2. An airscrew system, comprising two airscrews mounted on coaxial shafts, means for varying the pitch of one of the said airscrews whilst the pitch of the other airscrew is fixed, a differential comprising two driven wheels and a satellite gear train, one of the said driven wheels being operatively connected to transmit the driving movement to the shaft of one of the airscrews, the second driven wheel being operatively connected to transmit the driving movement to the shaft of the second airscrew, means for reversing the movement of the second shaft so that the airscrews rotate in opposite directions, connecting means between said reversing means and a stationary point of the system, means for driving the said satellite gear train by the engine of the aircraft, and means for varying the pitch of the variable-pitch airscrew in dependence upon the speed of rotation of the fixed-pitch airscrew, comprising weights, movable under the action of centrifugal force, connected to the shaft of the fixed-pitch airscrew, and elastic elements arranged to exert an opposing action on the said weights.

PIERRE ERNEST MERCIER.